(12) United States Patent
Kim

(10) Patent No.: US 7,840,613 B2
(45) Date of Patent: Nov. 23, 2010

(54) METHOD FOR PROVIDING AUDIO RENDITION AND STORAGE MEDIUM RECORDING THE SAME THEREON

(75) Inventor: Du-il Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 209 days.

(21) Appl. No.: 10/558,875

(22) PCT Filed: Jun. 4, 2004

(86) PCT No.: PCT/KR2004/001340
§ 371 (c)(1),
(2), (4) Date: Dec. 1, 2005

(87) PCT Pub. No.: WO2004/109689
PCT Pub. Date: Dec. 16, 2004

(65) Prior Publication Data
US 2006/0293772 A1     Dec. 28, 2006

(30) Foreign Application Priority Data
Jun. 4, 2003     (KR) ...................... 10-2003-0036040

(51) Int. Cl.
*G06F 17/30* (2006.01)
(52) U.S. Cl. ..................................... 707/821
(58) Field of Classification Search ............... 707/104.1
See application file for complete search history.

(56) References Cited

U.S. PATENT DOCUMENTS

| | | | |
|---|---|---|---|
| 5,574,898 A | | 11/1996 | Leblang et al. |
| 5,649,200 A | | 7/1997 | Leblang et al. |
| 5,812,853 A | | 9/1998 | Carroll et al. |
| 6,161,114 A | * | 12/2000 | King et al. |
| 6,230,173 B1 | * | 5/2001 | Ferrel et al. |
| 6,457,030 B1 | * | 9/2002 | Adams et al. |
| 6,515,212 B2 | | 2/2003 | Taira et al. |
| 6,606,633 B1 | * | 8/2003 | Tabuchi |
| 7,107,110 B2 | * | 9/2006 | Fay et al. .................. 700/94 |

(Continued)

FOREIGN PATENT DOCUMENTS

JP     11-66827 A     3/1999

(Continued)

*Primary Examiner*—Wilson Lee
*Assistant Examiner*—Sheree N Brown
(74) *Attorney, Agent, or Firm*—Sughrue Mion, PLLC

(57) ABSTRACT

Disclosed is a method for providing audio rendition and storage medium recording the same thereon wherein audio rendition is provided so as to play audio content based on MPV Standard as the content writer desires, without respect to system environment.

The method for providing audio rendition functions comprises generating a master file and a rendition file which the master file is converted into so as to play a certain audio content, recording rendition information determined according to a rendition function relative to the generated master file on a resource file on which connection information between the master file and the rendition file is recorded, and executing the master file or the rendition file in the course of playing the audio content through the rendition information. The rendition function is provided by recording rendition information to indicate rendition attributes changing audio content according to data format or specific functions on a resource file of the audio content.

11 Claims, 4 Drawing Sheets

U.S. PATENT DOCUMENTS

| | | | |
|---|---|---|---|
| 7,126,051 B2 * | 10/2006 | Fay et al. | 84/609 |
| 7,162,314 B2 * | 1/2007 | Fay et al. | 700/94 |
| 7,213,035 B2 * | 5/2007 | Ornstein et al. | |
| 7,305,273 B2 * | 12/2007 | Fay et al. | 700/94 |
| 7,376,475 B2 * | 5/2008 | Fay et al. | 700/94 |
| 7,386,356 B2 * | 6/2008 | Fay et al. | |
| 2002/0121181 A1 * | 9/2002 | Fay et al. | |
| 2002/0122559 A1 * | 9/2002 | Fay et al. | |
| 2002/0133248 A1 * | 9/2002 | Fay et al. | |
| 2002/0133249 A1 * | 9/2002 | Fay et al. | |
| 2002/0143413 A1 * | 10/2002 | Fay et al. | |
| 2002/0161462 A1 * | 10/2002 | Fay et al. | |
| 2003/0033331 A1 | 2/2003 | Sena et al. | |
| 2004/0230608 A1 * | 11/2004 | Ornstein et al. | 707/104.1 |

FOREIGN PATENT DOCUMENTS

| | | |
|---|---|---|
| JP | 2000-48546 A | 2/2000 |
| JP | 2000-285657 A | 10/2000 |
| JP | 2001-126391 A | 5/2001 |
| JP | 2001-142495 A | 5/2001 |
| KR | 10-1999-0044715 A | 6/1999 |
| KR | 10-2001-0035676 A | 5/2001 |
| WO | WO 01/71501 A1 | 9/2001 |

* cited by examiner

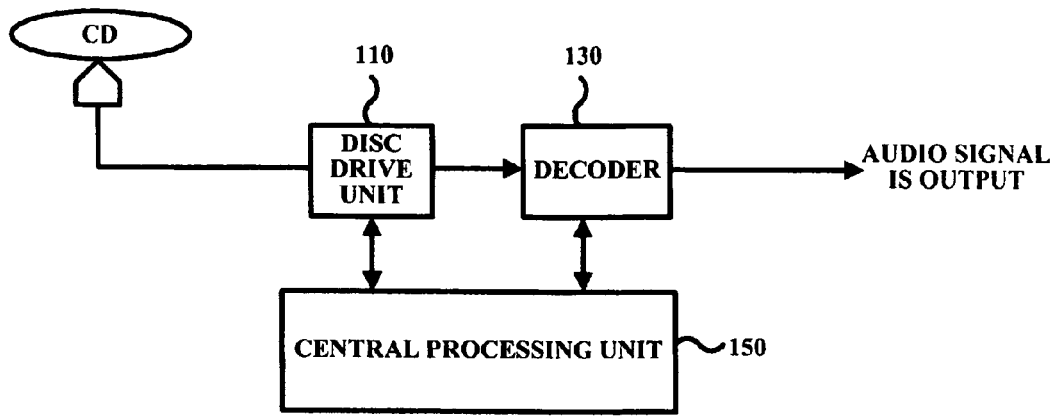
[Fig. 1]
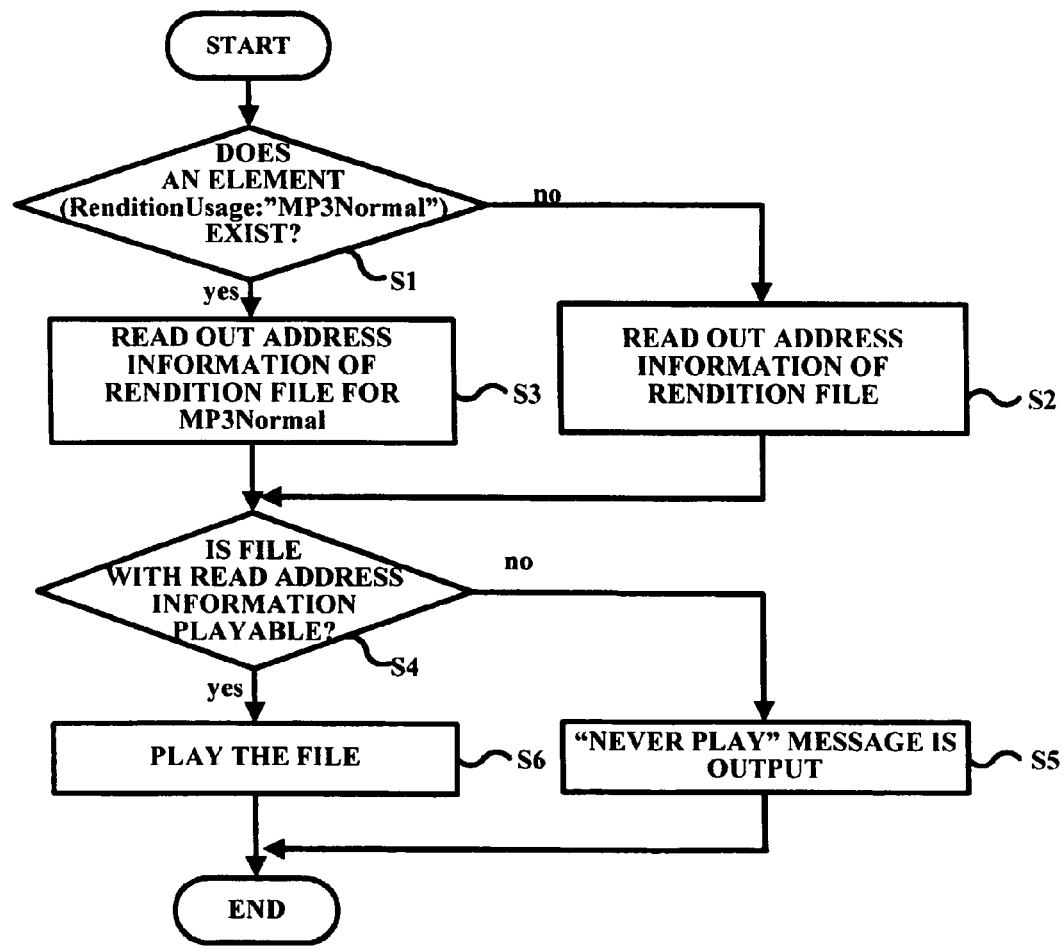
[Fig. 2]

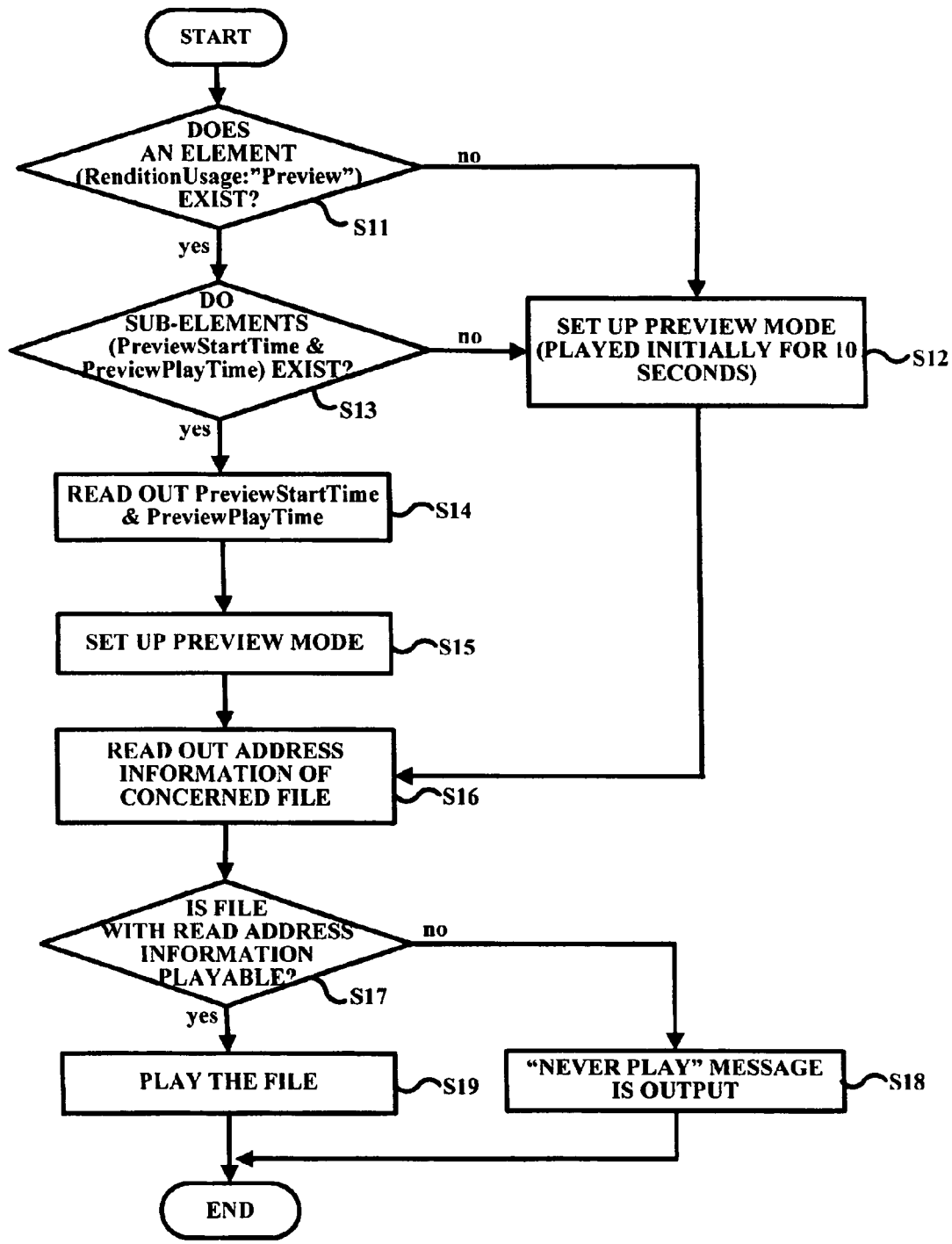
[Fig. 3]

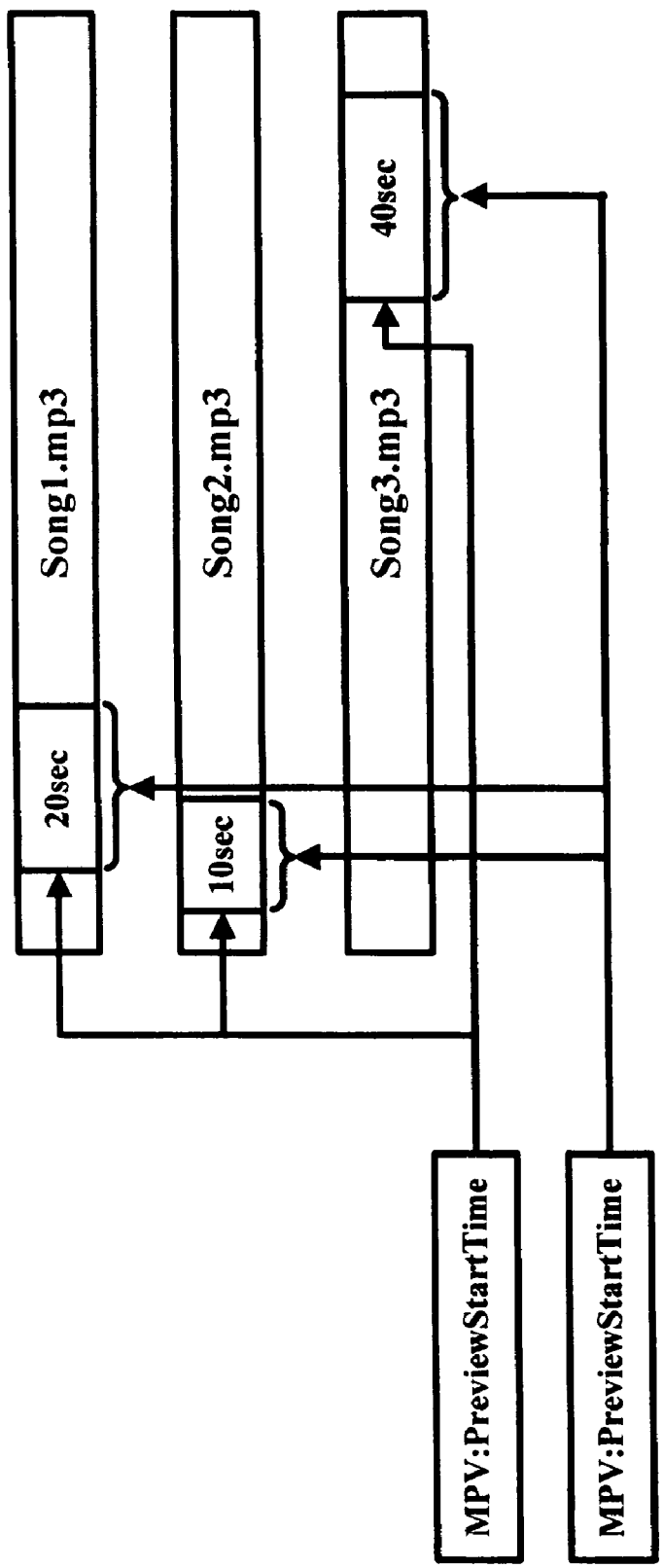
[Fig. 4]

[Fig. 5]
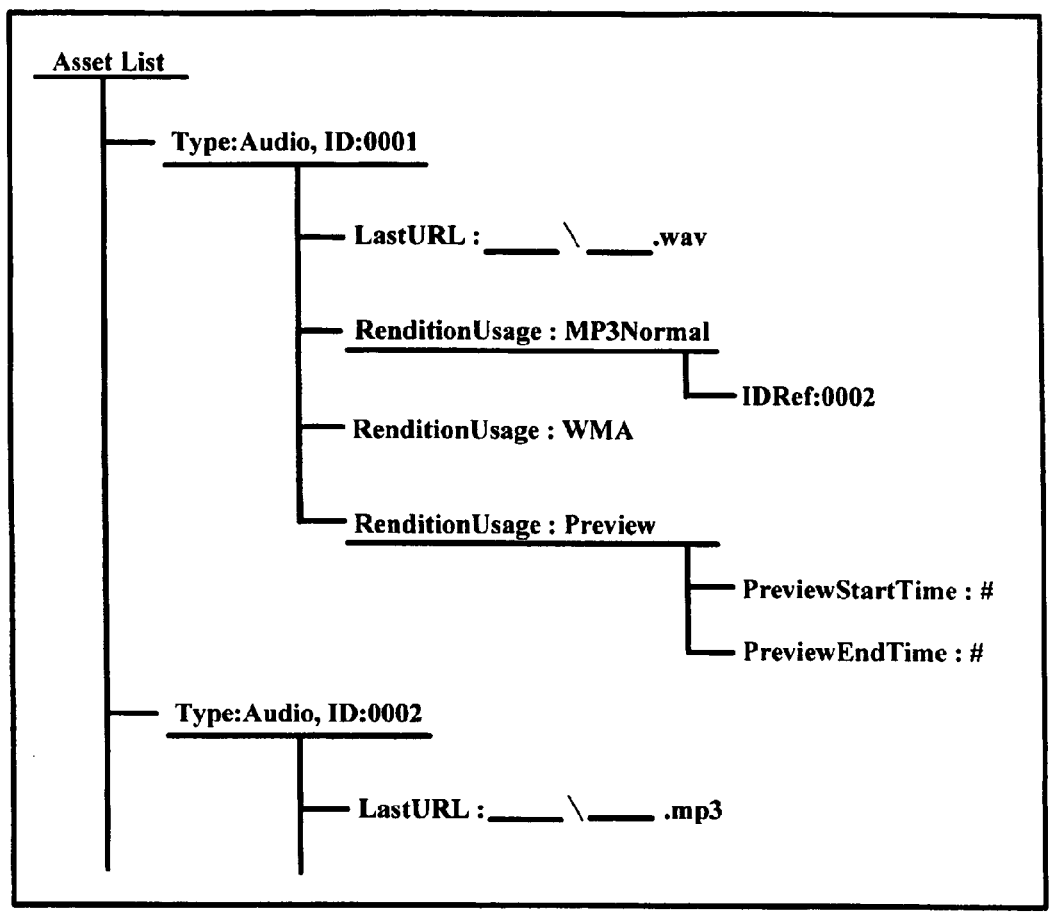

METHOD FOR PROVIDING AUDIO RENDITION AND STORAGE MEDIUM RECORDING THE SAME THEREON

TECHNICAL FIELD

The present invention relates to a method for providing audio rendition and storage medium recording the same thereon, and more particularly, to a method for providing audio rendition and storage medium recording the same thereon wherein an attribute of a rendition file converting audio content into a predetermined file format or an attribute set to execute a specific function is provided as rendition information for playing the audio content, to thereby enable the rendition function to be provided in the audio content based on MPV Standard, that is, MultiPhotoVideo or Music-PhotoVideo.

BACKGROUND ART

MPV is a Standard of multimedia titles used in the industry, published in November 2002 by OSTA (Optical Storage Technology Association, an international association established by optical storage device makers), and a standard for more conveniently providing users with various kinds of music, photo and video content or allowing users to handle and process multimedia data. The definitions and other standards on MPV are available from the official OSTA web site.

The MPV provides metadata in XML (Extensible Markup Language) format (hereinafter referred to as 'resource file') to provide information to play multimedia content stored on the CD by means of a variety of players such as a CD player or a DVD player as the content writer desires.

MPV also provides a function of rendition to convert multimedia content into various formats even in embedded systems of the non-PC type, inferior in performance to a PC.

Hereinbelow, a converted multimedia content file obtained through the rendition function will be defined as 'a rendition file' and the original multimedia content file will be defined as 'a master file'.

MPV has also proposed RenditionUsage which indicates an attribute of the rendition function, converting a master file into a specific rendition file.

RenditionUsage is recorded on a resource file as information to play any concerned master file so as to allow a rendition file to be effectively used.

By way of example, assuming that there is a master file having 'Resolution=Very High (2 million pixels: 1600*1200), Data format=original format, Data Size=Very big, Display time=Very slow,' RenditionUsage is established depending upon an attribute of a rendition file generated by a conversion of the master file.

That is, RenditionUsage is established as 'screen' or 'thumbnail' according to the degree of adjusting data format and size through the rendition function.

Information in rendition files corresponding to respective RenditionUsage is as follows.

Rendition-usage: screen, resolution=TV screen resolution (NTSC: 640*480), Data Format=JPQ, Data Size=small (NTSC: about 100 Kb), display time=fast Rendition-usage: Thumbnail, resolution=Thumbnail resolution (160*120), Data format=JPG, Data size=Very small (less or than 20 KB), display time=Very fast

DISCLOSURE OF INVENTION

Technical Problem

Existing MPV Standard has defined this rendition function and RenditionUsage in connection only with image files.

Even in the case of audio content, data format varies according to system environment. Thus, it is needed a function to provide a variety of data formats to thereby allow data to be played on any of players without regard to system environment, and provide specific functions according to characteristics of audio content (for example, Preview, Speed (set of play speed)) adaptively to each audio content.

Therefore, there is an actual need of audio rendition so as to provide audio contents as modified in a various manner.

Technical Solution

The present invention is conceived to meet the need described above. An aspect of the present invention is to provide an audio rendition based on MPV Standard so as to allow audio content to be played as the content writer desires, without respect to system environment.

Another aspect of the present invention is to enhance interoperability and compatibility to audio content by providing the audio rendition.

According to an exemplary embodiment of the present invention, there is provided a method for providing audio rendition functions, comprising generating a master file and a rendition file which the master file is converted into so as to play a certain audio content, recording rendition information determined according to a rendition function relative to the generated master file on a resource file on which connection information between the master file and the rendition file is recorded, and executing the master file or the rendition file in the course of playing the audio content through the rendition information.

According to another exemplary embodiment of the present invention, there is provided a storage medium recording thereon a master file constituting audio content to play the audio content, a rendition file which the master file is converted into and a resource file containing file connection information between the master file and the rendition file, and rendition information to indicate attributes to the rendition file.

DESCRIPTION OF DRAWINGS

The above and other objects, features and advantages of the present invention will be apparent from the following detailed description of the preferred embodiments of the invention in conjunction with the accompanying drawings, in which:

FIG. 1 is a schematic diagram illustrating a player for a storage device according to an exemplary embodiment of the present invention;

FIG. 2 is a schematic diagram illustrating a process of handling RenditionUsage for a file format according to an exemplary embodiment of the present invention;

FIG. 3 is a schematic diagram illustrating a process of handling RenditionUsage for a preview function according to another exemplary embodiment of the present invention;

FIG. 4 is a schematic diagram illustrating audio content play area by the preview function according to an exemplary embodiment of the present invention; and FIG. 5 is a schematic diagram illustrating an element structure of a resource file according to an exemplary embodiment of the present invention.

MODE FOR INVENTION

In describing a method for providing audio rendition and storage medium recording the same thereon according to the present invention as above, it has been described that a rendition function relative to audio content based on MPV is provided, but which is only for illustrative purpose. In this regard, those whose have ordinary skill in the art may easily understand that various modifications and/or equal embodiments thereof may be possible in the manner of supporting a rendition function relative to multimedia contents including audio content.

Taking this into consideration, the protection scope of the present invention shall be defined based on the technical idea claimed in the claims to be described later.

Hereinafter, an apparatus and method for providing multimedia data using an MPV format according to preferred embodiments of the present invention will be explained in detail with reference to the accompanying drawings.

According to the present invention, rendition information to indicate an attribute to a rendition file of audio content generated through a rendition function or an attribute of a specific function to execute through a rendition file is recorded on a resource file, in the process of producing a storage medium on which audio content and the resource file to play the audio content to provide an audio rendition according to MPV will be recorded.

RenditionUsage added to provide the audio rendition as described above is recorded on an element of 'type:Audio, ID:xxxx' corresponding to a unique ID of the concerned master file, among sub-elements of the Asset List among elements constituting the resource file.

That is, it is recorded on a sub-element of the element of 'type:Audio, ID:xxx' along with actual address of the concerned master file.

By way of example, RenditionUsage may be recorded with respect to an attribute of data format converting the master file:

RenditionUsage: 'MP3Normal'
RenditionUsage: 'MP3VBR'
RenditionUsgae: 'Wave'
RenditionUsage: 'WMA'

Further, RenditionUsage may be recorded with respect to an attribute (Preview or Speed) to set up a function involved in playing a master file or a rendition file:

RenditionUsage: 'Preview'
RenditionUsage: 'High-Speed'
RenditionUsgae: 'LowSpeed'
RenditionUsage: 'ParagraphOne'
RenditionUsage: 'ParagraphTwo'
RenditionUsage: 'Refrain'

In the case of 'RenditionUsage: 'Preview',' information on StartTime and PlayTime requested according to the Preview function are added as below, which are defined in the unit of second. They may also be defined in the unit of data position (Offset) other than second.

Mpv:PreviewStartTime, mpv:PreviewPlayTime

'RenditionUsage:'High-Speed'' defines that an audio file recorded can be played at high speed.

'RenditionUsage:'LowSpeed'' defines that an audio file recorded can be played at low speed.

'RenditionUsage:'ParagaphOne'' or 'RenditionUsage:'ParagraphTwo'' defines first and second paragraphs at the time of playing the concerned music files, having the following sub-elements:

Mpv:ParagraphStartTime, mpv:ParagraphPlayTime.

'RenditionUsage:'Refrain'' defines the music refrain at the time of playing the concerned music files, having the following sub-elements:

Mpv:RefrainStartTime, mpv:RefrainPlayTime.'

By recording RenditionUsage on a resource file and providing a rendition function thereto, when a CD is inserted into a player, the player selects a master file or a rendition file in appropriate format to its own system environment so as to play the selected file according to the specific function as established.

FIG. 1 is a schematic diagram illustrating a player for a storage device according to an exemplary embodiment of the present invention. Referring to this figure, the player comprises a disc drive unit 10, a decoder 130 and a central processing unit (CPU) 150.

The player is similar in configuration and operation to conventional players generally used to play CDs, and thus, detailed description of each element will be omitted herein and a operational process using the CD produced according to the present invention will be described.

A user inserts a CD into a CD player, and the disk drive unit 110 picks up a resource file recorded on the CD through focusing and tracking and inserts the resource file into the decoder 130.

The decoder 130 decodes the resource file input through the disk drive unit 110 and then transmits it to the CPU 150.

The CPU 150 identifies information on the audio content recorded on the CD through the resource file input and detects the file format of the audio content to be played.

Subsequently, the CPU selects a file (master file or rendition file) in the format playable through its own player, reads out actual address information of the selected file through the resource file and then transmits the address information to the disk drive unit 110.

The disk drive unit 110 reads out the corresponding file recorded on the CD through the address information and inputs it into the decoder 130, and the decoded file is output as the original signals through the decoder 130.

Hereinbelow, a case when a user wishes to play a CD on which audio content is recorded by inserting the CD into a CD player with the information obtained through the resource file, wherein the master file has WAV format and Rendition Usages have respectively MP3Normal, MP3VBR and WMA, will be described by way of example.

When a user inserts a CD into a CD player and selects a Play button, a CD player identifies the file format (WAV) of a master file through a resource file and plays the master file because its own player is able to play the file format.

But, when a user inserts a CD into a DVD player and selects a Play button, a DVD player identifies the file format (WAV) of a master file through a resource file and searches for RenditionUsage of the concerned master file through the resource file because its own player is unable to play the file format.

After searching RenditionUsage of the concerned master file, if MP3Normal format playable in the DVD player is searched for among RenditionUsages, the CPU 150 reads out IDRef of the concerned rendition file recorded on RenditionUsage, searches for the concerned audio content element from the resource file by use of IDRef read out, and then reads out the actual address information.

After then, the CPU reads out the concerned rendition file and play it by use of the read address information.

As described above, a player searches for a rendition file in appropriate file format to its system environment through RenditionUsage obtained from the resource file recorded on a CD and provides audio content through the searched rendition file.

A process of handling RenditionUsage according to the present invention using a player operated described above will be described with reference to the accompanying drawings, under which it is assumed that the master file format of audio content recorded on a CD inserted into the player is not a basic audio content format playable in the player.

FIG. 2 is a schematic diagram illustrating a process of handling RenditionUsage for a file-format according to an exemplary embodiment of the present invention.

To identify whether there exists a rendition file of the basic audio content format (for example, MP3Normal) playable in the player, the player determines whether there exists RenditionUsage in the file format for MP3Normal among the RenditionUsages of a master file obtained from a resource file read out in a CD S1.

When it is determined that an MP3Normal element of RenditionUsage is in no existence, the player reads out address information of the rendition file so as to determine whether the rendition file in a different format is playable S2.

When it is determined that an MP3Normal element of RenditionUsage is in existence, the player reads out address information of the concerned rendition file S3.

With the use of address information of rendition file read out above, it is determined whether a rendition file having the read address information is playable S4.

When it is determined that the rendition file is not playable, a Never Play message is read out S5, but the concerned rendition file is played if the file is determined to be playable S6.

FIG. 3 is a schematic diagram illustrating a process of handling RenditionUsage for a preview function according to another exemplary embodiment of the present invention.

The player determines whether there exists RenditionUsage in the file format for Preview (RenditionUsage:'Preview') among the RenditionUsages of a master file obtained from a resource file read out in a CD inserted into the player S11.

When it is determined that there exists no Preview function, a Preview mode to play the first part of a master file for 10 seconds is set up S12. When there exists the Preview function, the player determines whether there are sub-elements such as 'PreviewStartTime:#' and 'Preview PlayTime:#' S13.

When it is determined that there exists neither 'PreviewStartTime:#' nor 'Preview PlayTime:#,' a Preview mode to play the first part of a master file for 10 seconds is again set up S12. When it is determined that both of 'PreviewStartTime:#' and 'Preview PlayTime:#' are in existence, the recorded values thereof are read out S14.

Then, with the use of the recorded values as read out, the Preview mode is set up S15.

As described above, if the Preview mode is set up so as to play the first part of the master file for 10 seconds or a part of the master file according to 'PreviewStartTime:#' and 'Preview PlayTime:#' read out, address information of the concerned file is read out S16.

Then, it is determined whether the file having the read address information is playable in the player S17. If the file is determined not to be playable, the Never Play message is output S18. If the file is determined to be playable, the concerned file is played S19.

For example, as illustrated in FIG. 4, audio content files in respective MP3 formats are played for the set value of PreviewPlayTime at the set value of PreviewStartTime according to 'PreviewStartTime:#' and 'Preview PlayTime:#' as designated.

The process of handling RenditionUsage according to a method for providing audio rendition and storage medium recording the same thereon will be described according to an exemplary embodiment of the present invention with reference to the accompanying drawing.

FIG. 5 is a schematic diagram illustrating an element structure of a resource file according to an exemplary embodiment of the present invention. As illustrated in FIG. 5, Actual address (LastURL) and RenditionUsage of the concerned master file are recorded on the master file element of audio content having ID:0001 (type:Audio, ID:0001) among sub-elements of Asset List.

RenditionUsage indicates attributes to a master file. The file format adopted in the present embodiment is MP3Normal, WMA and a specific function is Preview.

If a user inserts a CD having the above-described element structure into a player, a resource file in the CD is read out through the disc drive unit 110 and the decoder 130 of the player and the decoded resource file is input into the CPU 150.

If play of an audio content recorded on the CD is requested through the input resource file, the CPU 150 selects an audio content element having the concerned ID among the sub-elements of AssetList.

After then, the CPU 150 determines whether a Preview element (RenditionUsage:'Preview') exists as the RenditionUsage recorded on the selected element.

If it is determined that the Preview element is in no existence, the Preview mode to play the file initially for 10 seconds is set up.

If it is determined that the Preview element is in existence, it is determined whether 'PreviewStartTime:#' and 'Preview PlayTime:#' are recorded on the sub-elements. According to the determination result, the Preview mode may be set up by reading out the set values of 'PreviewStartTime:#' and 'Preview PlayTime:#' or the Preview mode to play initially for 10 seconds may be set up.

If the Preview mode is set up through the above-described processes, the CPU 150 searches for any file format playable in its own player through LastURL and RenditionUsage of the master file obtained from a resource file.

At this time, where the playable file format in the player is MP3, the master file is not appropriate for play because its file format is '.way.' Thus, the CPU 150 searches for MP3 file format among RenditionUsages.

According to the search result, if RenditionUsage: MP3Normal is identified, the player reads out address information of the concerned rendition file (IDRef.:0002) recorded on the sub-elements of RenditionUsage: MP3Normal.

Then, the player searches for an element of 'ID:0002' among the sub-elements of Asset List by use of the read address information (IDRef.:0002) and plays it according to the Preview mode as set up after reading out the rendition file in MP3 file format through LastURL.

Through the processes described thus far, audio content recorded on a CD can be played through a rendition file without respect to system environment of a player.

A rendition file with the following rendition formats can be played in the same manner as described above at user's request.

RenditionUsage: 'High Speed'
    RenditionUsgae: 'LowSpeed'
    RenditionUsage: 'ParagraphOne'
    RenditionUsage: 'ParagraphTwo'
    RenditionUsage: 'Refrain'

INDUSTRIAL APPLICABILITY

According to the present invention, there is provided a rendition function relative to audio content by recording rendition information to indicate rendition attributes to change audio content depending upon data format or a specific function on a resource file of the audio content.

Further, the present invention improves interoperability and compatibility relative to audio content, thereby enabling audio content to be played without respect to system environment through the rendition function relative to the audio content.

Although the present invention has been described in connection with the embodiments of the present invention shown in the accompanying drawings, it is not limited thereto. It will be apparent to those skilled in the art that various substitutions, modifications and changes may be made thereto without departing from the scope and spirit of the invention.

The invention claimed is:

1. A computer readable storage medium having recorded thereon an audio content executable by a machine, the computer readable storage medium comprising:
    a master file, executable by said machine, comprising said audio content in a first data format;
    a rendition file, executable by said machine, which the master file is converted into, the rendition file comprising said audio content in a second data format; and
    a resource file, executable by said machine, containing file connection information between the master file and the rendition file, and rendition information to indicate attributes to the rendition file,
    wherein a computer reads the resource file and selects one of the master file and rendition file for playback of said audio content, based on the read resource file,
    wherein the rendition information defines specific functions in playing the audio content and a method to execute the specific functions,
    wherein said resource file contains an address information of said master file and said rendition file, and
    wherein said computer selects one of the address information of said master file and said rendition file from said resource file.

2. The medium as claimed in claim 1, wherein the rendition information comprises information on data format determined depending upon an attribute of the rendition file.

3. The medium as claimed in claim 1, wherein the rendition information comprises at least one of Speed to set up the play speed of the rendition file, Preview to play a portion of the audio content, first Paragraph of the audio content, second Paragraph of the audio content, and Refrain to define refrain of the audio content.

4. The medium as claimed in claim 1, wherein the audio content is playable through one of the master file and the rendition file.

5. The medium as claimed in claim 1, wherein said computer selects one of the master file and rendition file based on a system configuration of a playback device playing said audio content.

6. The medium as claimed in claim 1, wherein said master file, said rendition file and said resource file are separate files.

7. The medium as claimed in claim 1, wherein said resource file is decoded prior to being read by said computer.

8. A method for providing audio rendition functions, comprising:
    generating a master file in a first data format;
    generating a rendition file which the master file is converted into, the rendition file comprising said audio content in a second data format;
    determining rendition information according to a rendition function relative to the generated master file;
    recording the rendition information on a resource file on which connection information between the master file and the rendition file is recorded; and
    executing, by a central processing unit, the master file or the rendition file in a course of playing the audio content through the rendition information,
    wherein the rendition information comprises definitions for specific functions and performing the specific functions in playing the audio content,
    wherein said resource file contains an address information of said master file and said rendition file, and
    wherein said central processing unit selects one of the address information of said master file and said rendition file from said resource file.

9. The method as claimed in claim 8, wherein a designated part in the master file or the rendition file is played based on the information defined so as to play the specific functions in the course of playing the audio content.

10. The method as claimed in claim 8, wherein the rendition information comprises at least one of Speed to set up the play speed of the rendition file, Preview to play a portion of the audio content, first Paragraph of the audio content, second Paragraph of the audio content, and Refrain to define refrain of the audio content.

11. The method as claimed in claim 8, wherein the audio content is playable through one of the master file and the rendition file.

* * * * *